US007048865B1

(12) United States Patent
McGee et al.

(10) Patent No.: US 7,048,865 B1
(45) Date of Patent: May 23, 2006

(54) METHOD OF USE OF A HIGH PRESSURE SOLID REMOVAL SYSTEM

(76) Inventors: Richard Harvey McGee, 7603 Fernbrook La., Houston, TX (US) 77064; Yong Fu Wang, 5242 Meadow Landing La., Sugarland, TX (US) 77473; Garry Thomas Hill, 4615 Cashel Glen, Houston, TX (US) 77069

( * ) Notice: Subject to any disclaimer, the term of this patent is extended or adjusted under 35 U.S.C. 154(b) by 0 days.

(21) Appl. No.: 11/028,451

(22) Filed: Jan. 3, 2005

Related U.S. Application Data

(63) Continuation of application No. 10/345,520, filed on Jan. 16, 2003, now Pat. No. 6,893,558.

(60) Provisional application No. 60/352,450, filed on Jan. 28, 2002.

(51) Int. Cl.
*B01D 21/26* (2006.01)
*E21B 21/06* (2006.01)
(52) U.S. Cl. .................................. 210/787; 166/75.12
(58) Field of Classification Search ................ 210/787, 210/512.1, 112; 166/75.12
See application file for complete search history.

(56) References Cited

U.S. PATENT DOCUMENTS 1,931,135 A * 10/1933 McLaughlin et al. ......... 55/392
5,078,875 A * 1/1992 Losing ....................... 210/295
5,570,744 A * 11/1996 Weingarten et al. ........ 166/357

* cited by examiner

*Primary Examiner*—Terry K. Cecil
(74) *Attorney, Agent, or Firm*—Buskop Law Group, P.C.; Wendy Buskop

(57) ABSTRACT

A method for removing particles from a high pressure flow stream entails flowing the high pressure flow stream into an inlet of a high pressure trap and flowing the flow stream from the inlet into a tube in the high pressure trap. The tube is adapted to accelerate the flow stream. The flow stream leaves the tube and de-accelerates as the stream flows into a chamber. The method continues by contacting the flow stream with a plate wound helically around an outside surface of the tube. The plate creates a cyclonic effect with the flow stream to remove particles from the flow stream. The particles are collected in a reservoir. The remaining particles are removed by flowing the flow stream towards a side outlet over the plate. The methods end by collecting the remaining particles in a reservoir forming collected particles and dumping the collected particles from the reservoir.

13 Claims, 2 Drawing Sheets

METHOD OF USE OF A HIGH PRESSURE SOLID REMOVAL SYSTEM

The present application is a continuation of U.S. patent application No. Ser. 10/345,520, filed on Jan. 16, 2003, now U.S. Pat. No. 6,893,558, which claims priority to U.S. Provisional patent application Ser. No. 60/352,450, filed on Jan. 28, 2002.

FIELD

The present embodiments relate to methods for the removal of sand, or rock or other particulate matter from a flow stream at high pressure, before the flow stream reaches manifolds or other production or drilling equipment with moving parts, which is typically called a sand knock out system.

The present embodiments relate further methods of use to equipment associated with a fluid producing well. In particular, the present embodiments relate to methods of use of an apparatus for separating sand from the fluids extracted from a well. The description, which follows, discloses the present embodiments in use with an oil well or a natural gas well, but the present embodiments are not limited to such use.

BACKGROUND

A need exists for a device for completions, which is inexpensive and can maintain the high pressure of a well, typically in the range of 15,000 psi, while removing particles such as sand from the flow stream.

In flowing fluids from a well, such as an oil well, or natural gas well, certain difficulties may arise depending upon the nature of the fluids being extracted. Frequently, sand is encountered as fluid is taken from the well. Sand, rock, and plug material must be separated from the liquid or natural gas flow to keep the completions running. If equipment is employed to remove the fluids, it is desirable that the rock and sand be removed from the other fluids or gasses before the liquid and/or natural gas enters the equipment, the equipment may stop working as effectively.

Particulate matter, especially sand, tends to abrade the moving surfaces into which the sand-bearing liquids, dry gas, wet gas and similar flow streams come into contact. For example, production equipment has a significantly shortened working lifetime when the liquids carry sand or other abrasive particulate matter.

Sand strainers are commercially available for insertion into a well casing to separate sand or other particulate matter from a flow stream. A need exists for a sand or rock remover, which performs at high pressures, such as between 8,000, and 20,000 psi.

While drilling or during operations, material coming from the well can include a combination of oil and sand and possibly rock in the flow stream. The rock and sand impede the flow of the oil or natural gas or desired material coming from the well. A need has existed to reduce the amount of sand in the flowing oil or natural gas from a well. The invention provides a method to reduce sand in the oil or natural gas flow from a well.

For purposes of promoting an understanding of the principles of the invention, reference will now be made to the embodiments illustrated in the drawings and specific language will be used to describe it. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

BRIEF DESCRIPTION OF THE DRAWINGS

The present embodiments will be explained in greater detail with reference to the appended Figures, in which.

Figure 1:
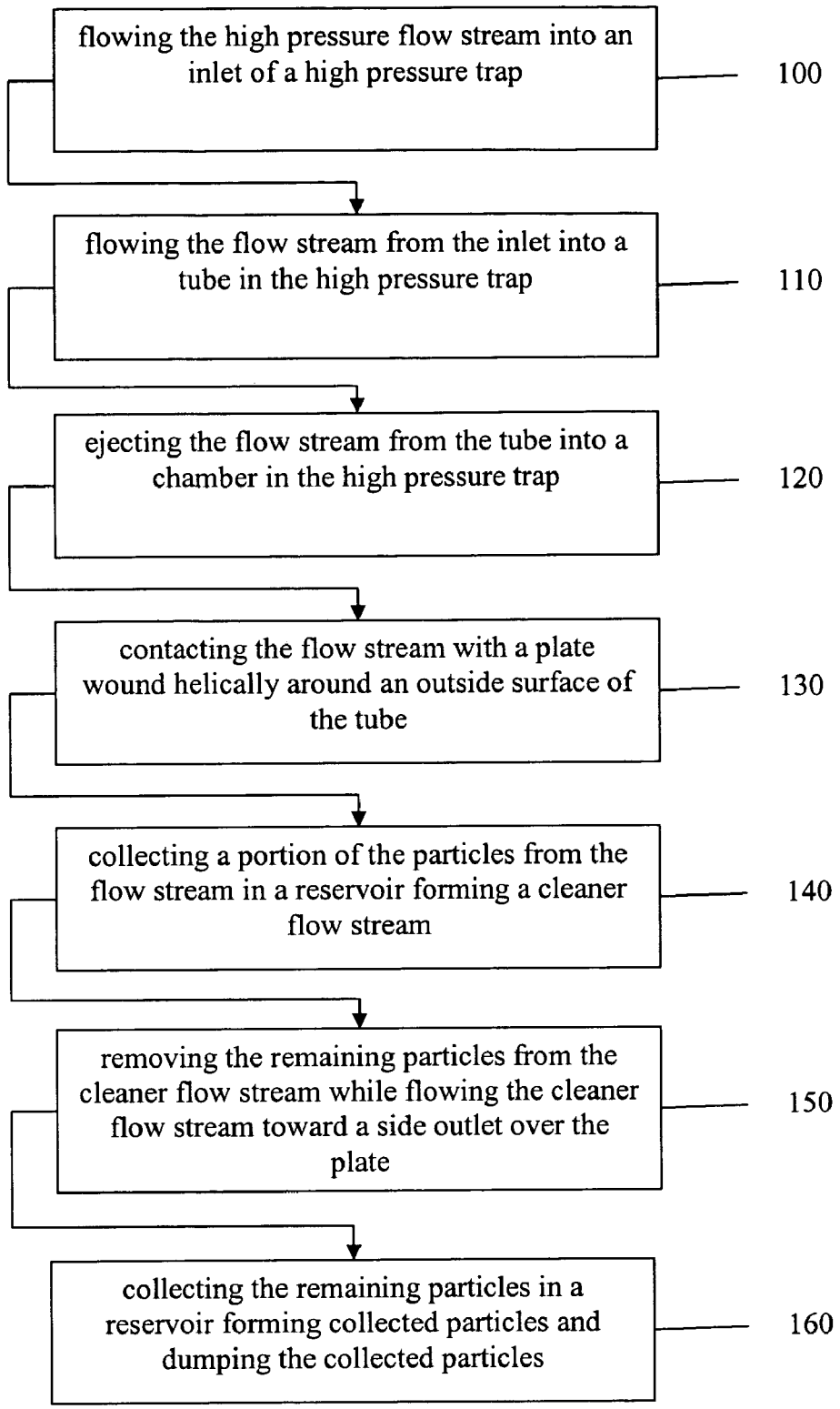
FIG. 1 is a schematic of an embodiment of a method for removing particles from a high pressure flow stream

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and it can be practiced or carried out in various ways.

The present embodiments are for methods of use of a sand trap or device for collecting rock, sand, or other particulate matter from a high pressure well. The methods provide a simple particulate removal device, particularly adapted for removing sand from flow streams as they come from the well. The methods further remove water-borne sand, or oil-borne sand, or both from a flow stream.

The present embodiments contemplate using a high pressure device to remove particles such as sand from a flow stream of a high pressure well while the device maintains the full pressure of the well.

The high pressure methods for removing particles from the flow stream of a high pressure well entail flowing the high pressure flow stream into an inlet; flowing the flow stream into a tube; and ejecting the flow stream from the tube into a chamber thereby changing the velocity of the flow stream. A plate is wound helically around the outside surface of the tube to contact the flow stream creating a cyclonic effect that removes particles from the flow stream. Some of the particles removed from the flow stream are collected into a reservoir, thereby forming a cleaner flow stream. The remaining particles from the cleaner flow stream are removed while flowing the cleaner flow stream toward a side outlet over the plate. The remaining particles are collected in the bottom reservoir. The methods end by dumping the collected particles from the bottom reservoir using a dump outlet controller.

Preferably, the device comprises an inlet port connected to a Christmas tree; a flange connected to the inlet port, a chamber connected to a top flange, a bottom flange connected to the chamber, a bottom reservoir formed in the chamber, a side wall connecting the top flange and the bottom flange, and wherein the side wall comprises a side outlet in fluid communication with a choke manifold; a dump outlet in communication with the bottom reservoir and connected to the bottom flange; and a dump outlet controller for opening and closing the dump outlet. In addition, a tube is connected to the top flange and the tube has a plate, which winds around the outside of the tube in a helical fashion creating a cyclonic effect with the flow stream.

In an alternative embodiment, the device includes a sand separator for use in separating sand and other particulates from a flow stream. The sand separator includes a deflector used at the end of the tube to deflect fluids from the tube and into the chamber. The plates are oriented on the outside of the tube such that the plates cause a cyclonic effect within the chamber as the flow stream moves from the tube orifice to the outlet of the chamber. The high velocity orifice of the tube through which liquids are expelled into the sand trapping chamber expels sand and particulate matter carried by the flow stream and accelerates the flow stream through the high velocity orifice. The flow stream is decelerated as the stream enters the sand trapping chamber because the sand trapping chamber has a greater flow section area than the inlet tube. This change in flow section area changes the velocity of the flow stream causing a portion of the sand and particulate matter carried by the flow stream to fall to a bottom reservoir. As the flow stream passes up the outside of the tubing along the plates on the outside surface; the remaining sand and particulate matter drop toward the bottom of the sand trapping chamber and are collected in the bottom reservoir. Sand and particulate matter additionally collected on the plates fall to the bottom reservoir. The bottom reservoir is opened to allow egress of the sand and particulate matter from the sand trapping chamber.

With reference to the figures, FIG. 1 is a schematic of an embodiment of a method for removing particles from a high pressure flow stream. The method begins by flowing the high pressure flow stream into an inlet of a high pressure trap (Step 100) and flowing the flow stream from the inlet into a tube in the high pressure trap, wherein the tube is adapted to accelerate the flow stream (Step 110). The methods can include the step of flowing the stream over a deflector, which is preferably, a "c" shaped deflector.

The flow stream travels from the tube into a chamber in the high pressure trap (Step 120). The chamber is adapted to de-accelerate the flow stream (Step 120). The flow stream contacts the plate wound helically around an outside surface of the tube (Step 130). The plate creates a cyclonic effect with the flow stream, thereby forcing particles to fall from the flow stream. The particles from the flow stream are collected in a reservoir located in the chamber (Step 140).

The remaining particles are removed from the cleaner flow stream by flowing the cleaner flow stream toward a side outlet over the plate (Step 150). The remaining particles are collected in the reservoir and the collected particles are dumped from the reservoir (Step 160).

Figure 2:
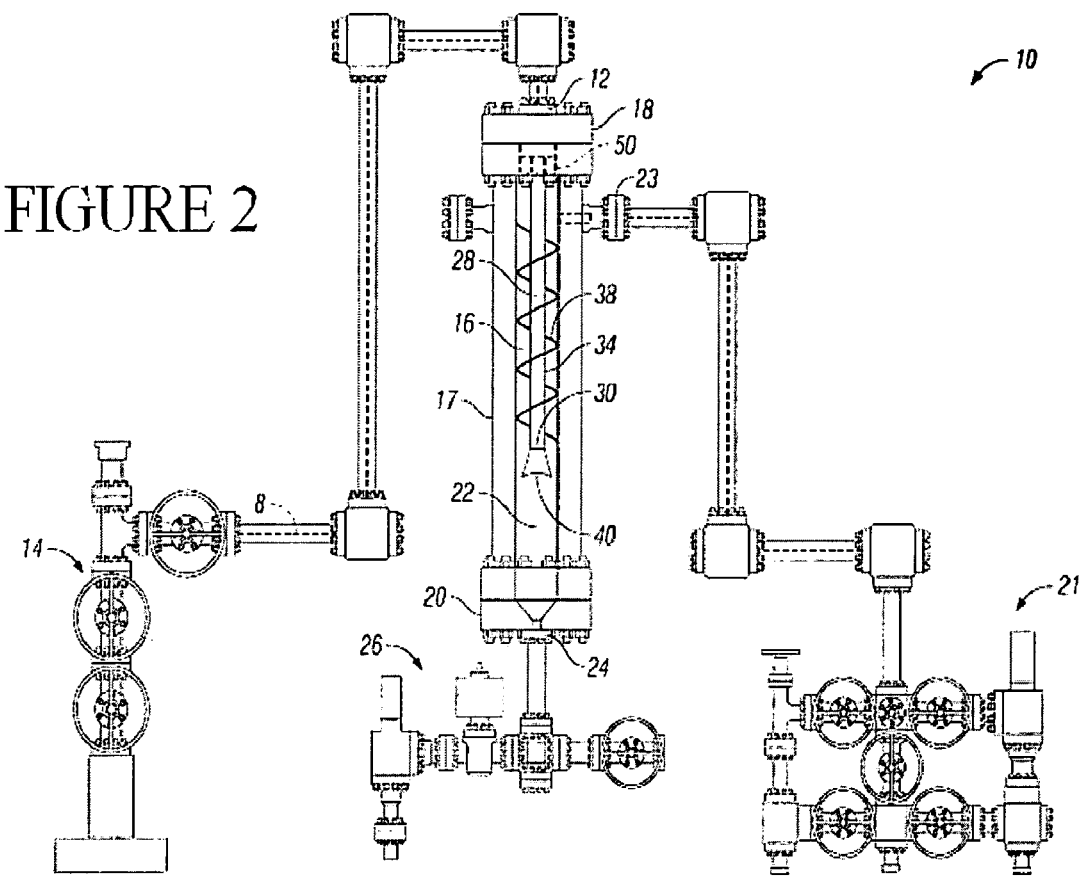
FIG. 2 depicts an embodiment of a high pressure device or trap for removing particles from a flow stream from a high pressure well through a Christmas tree.

FIG. 2 depicts an embodiment of a high pressure device or trap 10 for removing particles from a flow stream 8 from a high pressure well through a Christmas tree 14, such as an oil well or natural gas well wherein the trap maintains the full pressure (psi) of the well.

In the most preferred embodiment, the trap 10 has an inlet port 12 connected to the Christmas tree 14. A typical inlet port size has a 3-1/16" ID with a 15,000 psi working pressure. A top flange 18 connects to the inlet port 12. The flange 18 engages a chamber 16 and bottom flange 20. A typical chamber has a 13 5/8" ID with a typical length of 7 feet. A side wall 17 connects between top flange 18 and bottom flange 20. Bottom flange 20 connects to a bottom reservoir 22. A side outlet 23 is disposed in the side wall 17 is in fluid communication with a choke manifold 21. The side outlet typically has 3-1/16" ID with a 15,000 psi working pressure. A dump outlet 24 is connected to the bottom flange 20 and is in communication with the bottom reservoir 22. The dump outlet typically has a 2-1/16" ID with a 15,000 psi working pressure.

A dump outlet controller 26 can be connected to the dump outlet 24 and used for opening and closing the dump outlet 24. The dump outlet controller 26 can be a manual valve or manual controller, or alternatively, a hydraulic valve or hydraulic controller. The most preferred dump controller 26 is a combination of a hydraulic gate valve and a hydraulic choke. Either a hydraulic gate valve or a manual device can be used. An example of a usable hydraulic gate valve is a Cooper Cameron type FC 2-1/16" ID with a 15,000 psi working pressure. A typical manual dump controller can be a plug valve with 15,000 psi working pressure.

Continuing with FIG. 2, a tube 28 is secured to the top flange 18. The tube 28 has a first end 50 connected to the top flange 18, and a second end 30 opening into the chamber 16. The tube 28 has an inside surface (not shown) and an outside surface 34. A tube 28 is typically 5 feet long with an inner diameter of 3". A plate 38 is disposed on the outside surface 34 of the tube 28 and is oriented in a helical arrangement around the outside surface 34. The tube 28 is mounted within the chamber 16 to the top flange 18 such that the tube 28 does not contact the side wall 17 of the chamber 16. The tube 28 is disposed between the bottom reservoir 22 and the side outlet 23.

The top flange 18 and the bottom flange 20 can each be one flange, two flanges bolted together, or a flange and a plate bolted together. Bolts are the preferred attaching means of the tubing, flanges, inlets and outlets to facilitate repair of the chamber and the trap. Preferably, the top flange 18 is about 8-1/16" thick with a 34-7/8" OD and a 3-1/16" ID. The top flange 18 can be bolted to the chamber with about 20 bolts, each bolt being about 21" in length with a 2 1/4" diameter. The bottom flange 20 can be identical to the top flange 18 in the most preferred embodiment, although the flanges can be different in size and still be workable in the invention.

In a preferred embodiment, a deflector 40 is mounted on the second end 30 of the tube 28 to increase the dispersion of the flow stream as the stream exits the second end 30 of the tube 28. The deflector 40 is typically 3" across and 6" wide. The deflector 40 can have a rounded downward shape similar to a downwardly facing "c" shape. The tube 28 is connected near the center of the "c" to facilitate the dispersion of the flow stream into the chamber. Other deflectors could be used which are conical, plates or box shaped.

The sand trap can sustain pressures between 8,000 psi and 20,000 psi, most preferably between 10,000 psi and 15,000 psi, and specifically, the pressure of the well. The flow rate through the trap can be between 1 million cubic feet per day and 400 million cubic feet per day for natural gas and between 200 barrels per day and 5000 barrels per day for oil.

The apparatus used in the methods is designed such that the helically wound plate creates a cyclonic effect in the chamber and producing interference with the flow of the particles from the second end of the tube 28 to the side outlet 23. This plate can be formed from one plate cut from metal or can be made from metal segments, such as segmented plates welded together.

The helical plates 38 attached to the outside surface of the tube most preferably have a dimension of a 13 1/2" OD welded to the 4 1/2" OD of the tube 28. Typically, about 40 to 50 plates, preferably 45 plates, are welded together to form the helical plates.

In an alternative embodiment, the wall of the chamber can be coated with a ceramic material, a graphic composite material or combinations of these to improve wear on the chamber. Similarly, the inside surface of the tube 28 can be coated with the same material or combination to improve wear. Additionally, the high pressure trap can be made from a low alloy steel.

The trap and methods can be used collect particles, such as rocks, sand, cement, and drillable plug particles. Other particulate material can be trapped as well.

The methods can utilize a sand separator to separate sand and other particulates from flow being extracted from a well. The sand separator includes an inlet for receiving the fluids; a sand trapping chamber coupled to the inlet; and a tube with plates on the outside surface for accelerating the flow being extracted from the well. A deflector is located on one end of the tube for deflecting the fluids from the tube into the chamber. The tube has a high velocity orifice through which liquids are expelled into the sand-trapping chamber. The velocity of the flow rate is decreased as the flow enters the chamber. The liquids and any sand and particulate matter carried by the liquids are accelerated through the high velocity orifice propelled against the deflector. A portion of the sand falls to a bottom reservoir. The fluid flow passes up the outside of the tube along the plates on the outside surface. The flow changes using a cyclonic effect to a laminar flow as it pass over the plates. Sand and particulate matter falls to the bottom of the sand-trapping chamber and is collected in the bottom reservoir. Sand and particulate matter collected on the plates also falls to the bottom reservoir. The bottom reservoir is opened to allow egress of the sand and particulate matter from the chamber. The sand separator can be used to extract small particulate matter from both gaseous and liquid components.

The devices and methods can be used with various types of production, completion and drilling equipment, including standard tubing completions, concentric completions, casing tubing, dual completions, and other multiple zone completions. All of these are compatible with no modification or special treatment necessary to the sand trap unless the sand trap needs to be installed subsea. For subsea applications, the devices and methods can be used on diver less, diver assist, spool trees, platform tieback, side valve trees, vertical production tress, multi-well trees and several of the above. The devices and methods can be used with all choke manifolds that serve the purpose which is controlling flow and reducing pressure. The manifold can be a drilling, production, well testing or more sophisticated subsea manifold.

While these embodiments have been described with emphasis on the preferred embodiments, it should be understood that within the scope of the appended claims the embodiments might be practiced other than as specifically described herein.

What is claimed is:

1. A method for removing particles from a high pressure flow stream from a hydrocarbon well, comprising the steps of:
    a. flowing the high pressure flow stream into an inlet of a high pressure trap;
    b. flowing the flow stream from the inlet into a tube in the high pressure trap, wherein the tube is adapted to accelerate the flow stream;
    c. ejecting the flow stream from the tube into a chamber in the high pressure trap adjacent a second end of the tube, wherein the chamber is adapted to de-accelerate and redirect the flow stream along an outside surface of the tube to flow upwardly in a direction opposite the first direction;
    d. contacting the flow stream with a plate wound helically around the outside surface of the tube, wherein the plate is adapted to create a cyclonic effect with the flow stream;
    e. collecting a portion of the particles from the flow stream in a bottom reservoir forming a cleaner flow stream;
    f. removing the remaining particles from the cleaner flow stream while flowing the cleaner flow stream over the plate and toward a side outlet adjacent a first end of the tube;
    g. collecting the remaining particles in the bottom reservoir forming collected particles; and
    h. dumping the collected particles from the bottom reservoir.

2. The method of claim 1, wherein the high pressure trap comprises:
    a. the inlet;
    b. the chamber comprising the reservoir;
        i. a top flange connected to the inlet;
        ii. a bottom flange connected to the bottom reservoir; and
        iii. a side wall connecting the top flange and the bottom flange, wherein the side wall comprises a side outlet in fluid communication with a choke manifold;
    c. a dump outlet in communication with the reservoir;
    d. a dump outlet controller adapted to open and close the dump outlet;
    e. a tube disposed in the chamber, wherein the tube comprises the plate disposed on the outside surface of the tube, wherein the plate is oriented in a helical arrangement around the outside surface, and wherein the tube is mounted within the chamber to change the velocity of the flow stream the flow stream is passed from the tube into the chamber.

3. The method of claim 2, wherein the inlet is connected to a Christmas tree.

4. The method of claim 2, wherein the chamber further comprises a top flange connected to the inlet; a bottom flange connected to the reservoir; and a side wall connecting the top flange and the bottom flange, wherein the side wall comprises a side outlet in fluid communication with a choke manifold.

5. The method of claim 1, wherein the step of flowing the high pressure flow stream into the inlet of the high pressure trap is performed at pressures ranging from about 8,000 psi to about 20,000 psi.

6. The method of claim 5, wherein the step of flowing the high pressure flow stream into the inlet of the high pressure trap is performed at pressures ranging from about 10,000 psi to about 15,000 psi.

7. The method of claim 6, wherein the step of flowing the high pressure flow stream into the inlet of the high pressure trap is performed at a flow rate between 1 million cubic feet per day and 400 million cubic feet per day.

8. The method of claim 1, wherein the step of contacting the flow stream with the plate wound helically around the tube plate creates a cyclonic effect in the chamber producing interference with the flow of the particles.

9. The method of claim 1, wherein the step of dumping the collected particles from the reservoir utilizes a dump outlet controller adapted to open and close a dump valve connected to the reservoir.

10. The method of claim 9, wherein the dump valve is a mechanical valve or a hydraulic mechanism.

11. The method of claim 1, further comprising the step of contacting the flow stream with a deflector secured to the tube.

12. The method of claim 11, wherein the deflector consists of a rounded downward shape.

13. The method of claim 1, wherein the particles are a member of the group consisting of rock, sand, cement, drillable plug particles, and combinations thereof.

* * * * *